United States Patent
McLaughlin et al.

(10) Patent No.: US 8,521,357 B2
(45) Date of Patent: Aug. 27, 2013

(54) IMPAIRED OPERATION DETECTION METHOD

(75) Inventors: Shane McLaughlin, Blacksburg, VA (US); Hiroshi Tsuda, McLean, VA (US); Jon Hankey, Blacksburg, VA (US); Tomohiro Yamamura, Kanagawa (JP); Nobuyuki Kuge, Kanagawa (JP)

(73) Assignees: Nissan North America, Inc., Franklin, TN (US); Nissan Motor Co., Ltd., Kanagawa (JP); Virginia Tech Intellectual Property, Inc., Blacksburg, VA (US)

( * ) Notice: Subject to any disclaimer, the term of this patent is extended or adjusted under 35 U.S.C. 154(b) by 614 days.

(21) Appl. No.: 12/767,385

(22) Filed: Apr. 26, 2010

(65) Prior Publication Data

US 2011/0264325 A1    Oct. 27, 2011

(51) Int. Cl.
G06F 7/00    (2006.01)

(52) U.S. Cl.
USPC .......................................................... 701/36

(58) Field of Classification Search
None
See application file for complete search history.

(56) References Cited

U.S. PATENT DOCUMENTS

| | | | |
|---|---|---|---|
| 3,811,116 A | 5/1974 | Takeuchi et al. | |
| 4,005,398 A | 1/1977 | Inoue et al. | |
| 4,604,611 A | 8/1986 | Seko et al. | |
| 5,465,079 A | 11/1995 | Bouchard et al. | |
| 5,694,116 A | 12/1997 | Kojima | |
| 5,745,031 A | 4/1998 | Yamamoto | |
| 5,821,860 A | 10/1998 | Yokoyama et al. | |
| 7,427,924 B2 | 9/2008 | Ferrone et al. | |
| 7,455,146 B2 | 11/2008 | Brosig et al. | |
| 8,073,608 B2 * | 12/2011 | Hulten et al. | 701/91 |
| 2001/0003436 A1 | 6/2001 | Yoshikawa | |
| 2003/0042790 A1 * | 3/2003 | Amberkar | 303/140 |
| 2003/0102181 A1 * | 6/2003 | Tokumoto | 180/446 |
| 2004/0024504 A1 * | 2/2004 | Salib et al. | 701/38 |
| 2004/0024505 A1 * | 2/2004 | Salib et al. | 701/38 |
| 2009/0271074 A1 * | 10/2009 | Hulten et al. | 701/42 |

FOREIGN PATENT DOCUMENTS

| | | |
|---|---|---|
| EP | 1 426 258 A1 | 6/2004 |
| JP | S58-175094 | 10/1983 |
| JP | 11-09992 A | 4/1999 |
| WO | WO-02/17787 A1 | 3/2002 |

OTHER PUBLICATIONS

European Search Report of the corresponding European Application No. 11 16 3694.0-1264, dated Aug. 10, 2011.

* cited by examiner

*Primary Examiner* — Thomas Tarcza
*Assistant Examiner* — Adam Alharbi
(74) *Attorney, Agent, or Firm* — Global IP Counselors, LLP

(57) ABSTRACT

An impaired operation detection method is basically performed by sensing a yaw rate of a vehicle over a time period. Then time points are identified in which the yaw rate changes direction. A linear rate of change in the yaw rate is determined between two of the time points that are sequential in time. An actual rate of change is examined between the two time points. A difference between the actual rate of change and the linear rate of change to obtain a difference value. Then, the operator's impairment condition is determined based on the difference value.

24 Claims, 5 Drawing Sheets

IMPAIRED OPERATION DETECTION METHOD

BACKGROUND

1. Field of the Invention

The present invention generally relates to an impaired operation detection method. More specifically, the present invention relates to an impaired operation detection method that determines impairment of a vehicle operator based on yaw rate of the vehicle.

2. Background Information

Impaired vehicle operation due to operator intoxication, fatigue, or distraction is a serious and often life-threatening problem. As a result, efforts are being made to identify impaired operators so that, for example, their further operation of a vehicle can be prevented until their impaired condition has subsided. These efforts include external observation of a vehicle as it is moving, and observation of operator characteristics, such as facial expression, gestures, posture, and so on. These efforts also include in-vehicle sensing methods which include dosage type measures such as blood alcohol content (BAC) detection, and other operating performance measures which quantify operating performance or operating behavior such as lane position and lane crossing, headway and following, and steering, to name a few.

However, these techniques tend to produce false positives or negatives in which normal operator characteristics are incorrectly identified as indicative of operator impairment or vice-versa. Accordingly, there is a continuing need for more accurate methods for identifying operator impairment.

SUMMARY

It has been discovered that with conventional technology, observation of a vehicle as it is moving, as well as observation of operator characteristics, operating performance and operating behavior, and in-vehicle sensing methods, can be used to assess operator impairment.

In view of the state of known technology, one aspect of the present invention is to provide an impaired operation detection method comprising sensing a yaw rate of a vehicle, identifying time points, determining a linear rate of change in the yaw rate, examining an actual rate of change in the yaw rate, determining a difference between a first time and a second time, and determining an operator's impairment condition. The sensing senses the yaw rate of a vehicle over a time period. The time point identifying identifies the time points of the time period in which the yaw rate changes direction. The linear rate change determining determines the linear rate of change in the yaw rate between two of the time points that are sequential in time. The actual rate change examining examines the actual rate of change in the yaw rate occurring between the two of the time points. The difference determining determines the difference between the actual rate of change and the linear rate of change to obtain a difference value. Then, the operator impairment determining determines the operator's impairment condition based on the difference value.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
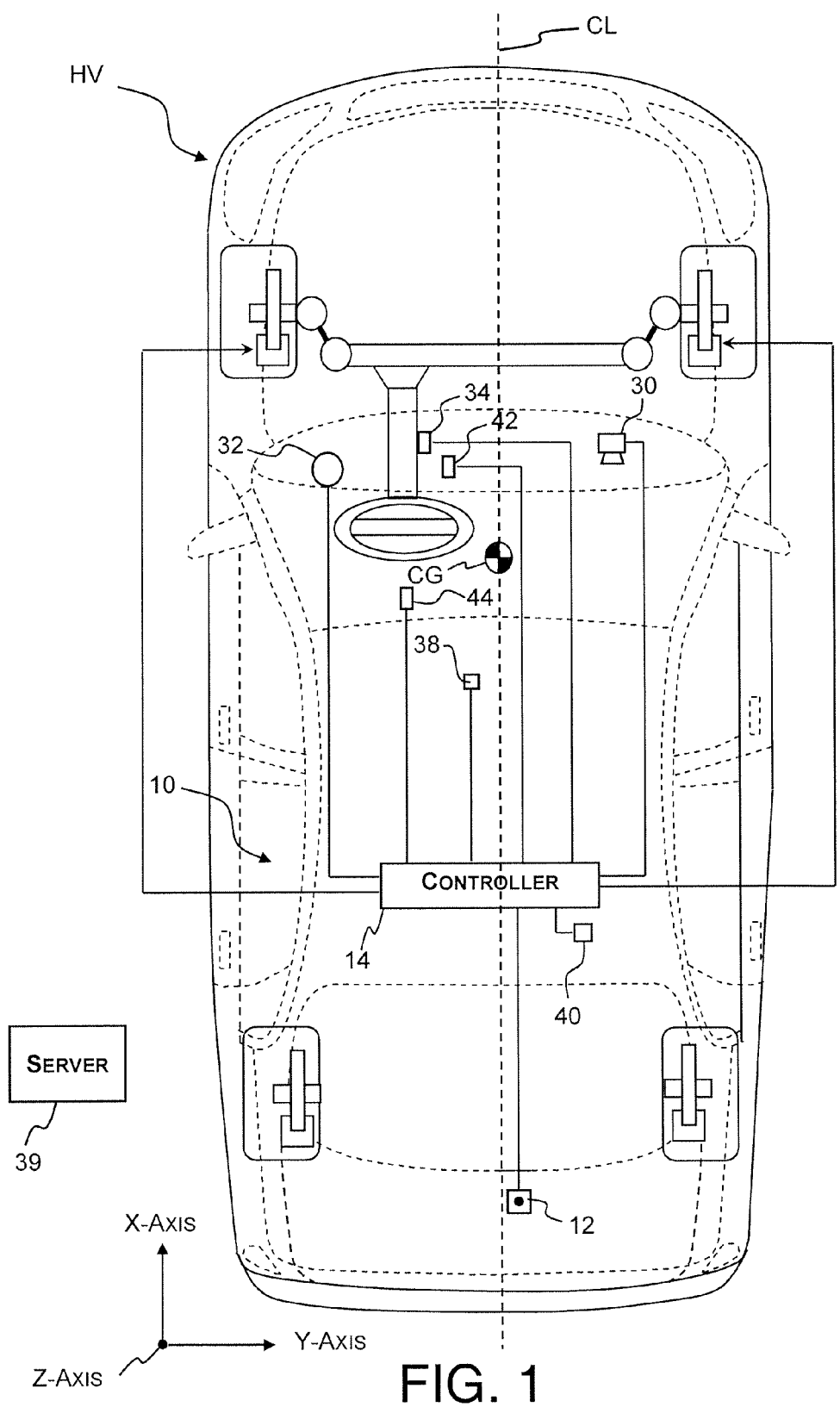
FIG. 1 is a schematic top plan view of a vehicle that is equipped with an impaired operation detection system in accordance with an illustrated embodiment.

FIG. 1 illustrates an example of a host vehicle HV, such as an automobile, that is equipped with an impaired operation detection system 10 in accordance with an illustrated embodiment. Although an automobile is illustrated, the term "vehicle" can refer to any type of vehicle such as a truck, motorcycle or other single or multi-wheeled terrestrial vehicles, a boat or other water vehicle, an airplane, helicopter or other aeronautical vehicle, machinery, and other industrial equipment, snow machine or winter sport vehicles, and the like. The impaired operation system can also be implemented in an off-vehicle processing situation, or in data mining application, where stored sensor data on a server (e.g., server 39 discussed below) is processed at some time long after the vehicle data were recorded. In FIG. 1, a coordinate system is shown with an X-axis corresponding to a longitudinal direction of the vehicle HV, a Y-axis corresponding to a widthwise (lateral) direction of the vehicle HV, and a Z-axis corresponding to a vertical direction of the vehicle HV Generally, the impaired operation detection system 10 mainly includes, among other things, at least one yaw rate sensor 12 and a controller 14. The yaw rate sensor 12 can be a conventional yaw rate sensor including a quartz transducer, semiconductor device or a gyroscope that measures a rate of rotation around the vertical axis (Z-axis) passing through the host vehicle HV. The yaw rate sensor 12 detects the yaw rate of the host vehicle HV. Alternatively, a global positioning system (GPS) device can be used to detect the yaw rate of the vehicle HV and thus can be employed as a yaw rate sensor. Also, detectors which sense vehicle wheel speed to determine yaw rate can be employed as would be understood by one skilled in the art. For purposes of example, the discussion herein refers to a yaw rate sensor 12. However, it should be understood that the positioning and features of the yaw rate sensor 12 is applicable to each of the yaw sensors 12 in an arrangement having multiple yaw rate sensors 12 or different types of yaw rate sensors.

The yaw rate sensor 12 is operatively (e.g., electrically) coupled to a controller 14 and provides a signal representing the yaw rate of the vehicle HV. The yaw rate sensor 12 can be disposed in many locations in the vehicle HV, such as close to the center of gravity (CG) of the vehicle HV. In this example, the yaw rate sensor 12 is disposed in the vehicle trunk near the rear seat. The yaw rate sensor 12 is preferably mounted towards the center longitudinal axis (CL) of the host vehicle HV. As understood by one skilled in the art, standard calculations in rigid body dynamics can be performed by, for example, the controller 14, if desired, to convert the yaw rate output by the yaw rate sensor 12 to represent the yaw rate at the CG of the vehicle. Also, because the yaw rate sensor 12 is measuring rotation around the vertical axis (Z-axis) of the vehicle HV, the yaw rate sensor 12 is not tilted, or substantially not tilted, with respect to the X-Y plane in which the vehicle HV resides.

The controller 14 preferably includes a microcomputer with a control program that controls operations for monitoring yaw rate over a monitoring period, and for determining lead and lag in yaw rate to ascertain operation impairment as discussed below. For purposes of this disclosure, the term "impaired" or "impairment" refers to operator intoxication caused by alcohol and/or drugs, and also refers to impairment due to operator fatigue, operator illness, operator distraction, and any other physiological, biological or chemical condition that adversely affects an operator's ability to operate a vehicle, such as an automobile, truck, motorcycle or other single or multi-wheeled terrestrial vehicles, a boat or other water vehicle, an airplane, helicopter or other aeronautical vehicle, machinery and other industrial equipment, a snow machine or winter sport vehicles, and the like.

The controller 14 can also include other conventional components such as an input interface circuit, an output interface circuit, and storage devices such as a ROM (Read Only Memory) device and a RAM (Random Access Memory) device which store processing results and the control program. For example, the internal RAM of the controller 14 stores statuses of operational flags and various control data, and the internal ROM of the controller stores the control program for various operations. The controller 14 is operatively coupled to the components discussed below in a conventional manner, and is capable of selectively controlling any of the components in accordance with the control program. It will be apparent to those skilled in the art from this disclosure that the precise structure and algorithms for the controller 14 can be any combination of hardware and software that will carry out the functions of the illustrated embodiment.

Figure 2:
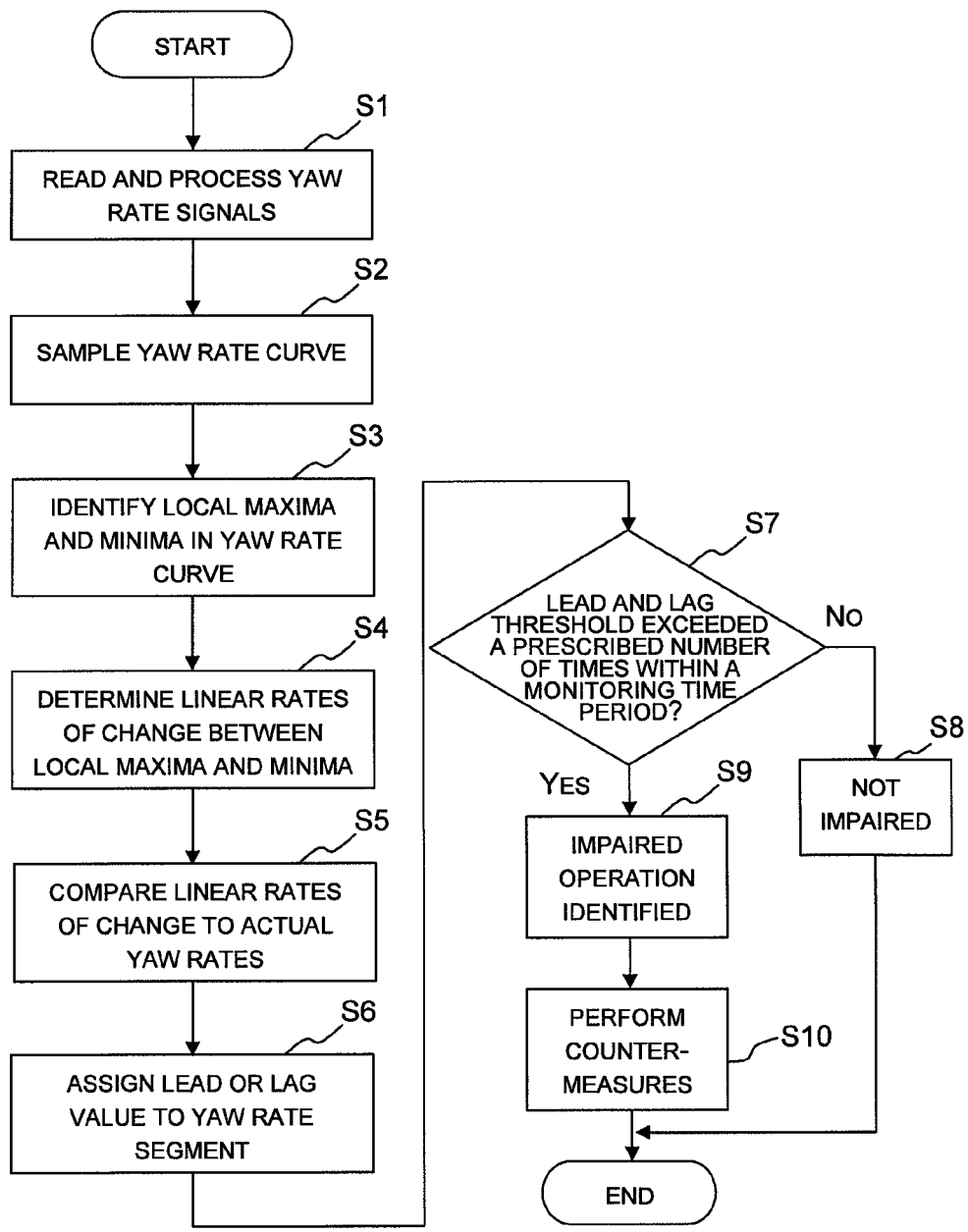
FIG. 2 is a flowchart illustrating an exemplary process executed by the controller of the impaired operation detection system to determine operator impairment in accordance with the illustrated embodiment of FIG. 1.
Figure 3:
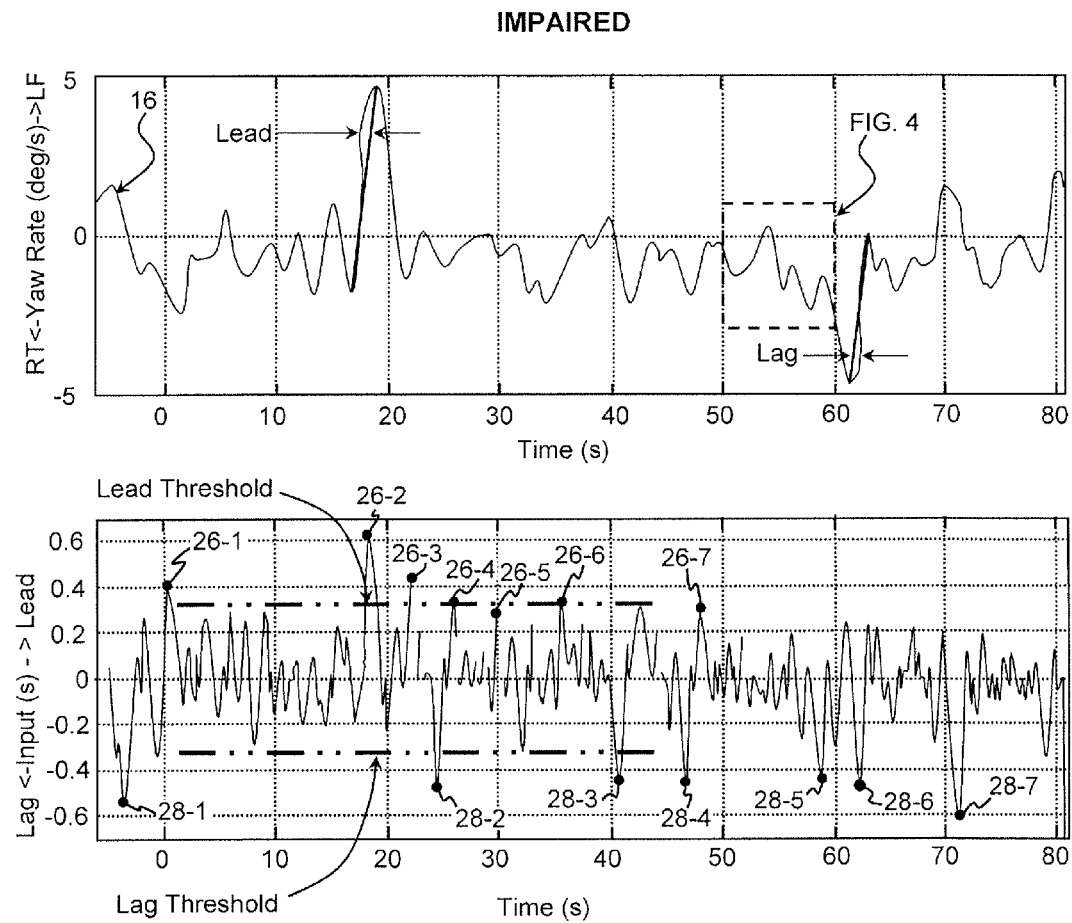
FIG. 3 is a graph set illustrating an example of yaw rate of the vehicle over a time period for an impaired operation condition.

As will now be discussed, the illustrated embodiment monitors changes in yaw rate over a period of time to detect impairment of an operator of the vehicle HV. As indicated in the exemplary flowchart of FIG. 2, the controller 14 receives signals from the yaw rate sensor 12 representing the yaw rate of the vehicle over a period of time in step S1. FIG. 3 is an exemplary graphical representation of the detected yaw rate curve 16 in degrees/second over a monitoring period of time having a duration of approximately 80 seconds in this example. In step S2, the controller 14 samples the yaw rate curve 16 at a desired sampling rate. In this example, the sampling rate is 10 Hz (i.e., ten samples per second). However, the sampling rate can be set at any appropriate sampling rate as would be understood by one skilled in the art. Moreover, the controller 14 can sample the yaw rate curve 16 at or about the time in which the yaw rate signals are being received from the yaw rate sensor 12, or after a period of time has elapsed, in which event the signals are stored and sampled by the controller 14 at a designated time after their receipt.

Figure 4:
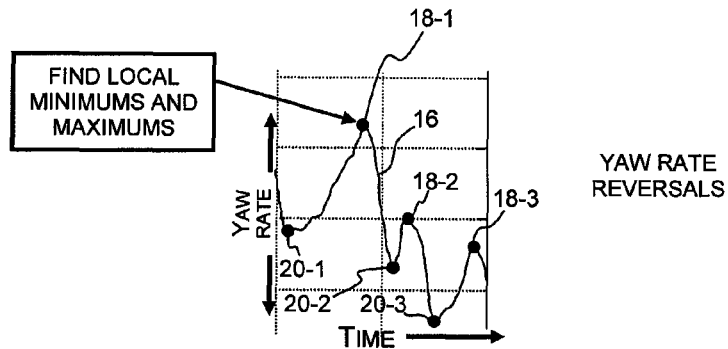
FIG. 4 is a detail view of a portion of the upper graph of the graph set shown in FIG. 3, which more explicitly identifies local maxima and minima of the graph.

In step S3, the controller 14 identifies local maxima and minima in the yaw rate curve 16. A portion of the yaw rate curve 16 in which local maxima 18-1, 18-2, 18-3 and local minima 20-1, 20-2 and 20-3 are identified is shown in more detail in FIG. 4. As understood in the art, a point that is a maximum between two minimums is a "local maximum," and similarly, a point that is a minimum between two maximums is a "local minimum." In this example, the controller 14 applies a conventional smoothing algorithm, such as a moving average or low pass filtering, to the yaw rate curve 16. This smoothing can create small delays that are generally on the order of seconds or fractions of seconds. However, since operation impairment is determined over a monitoring period which is longer than the delays, these slight delays do not adversely affect the accuracy of the impaired operation determination.

Figure 5:
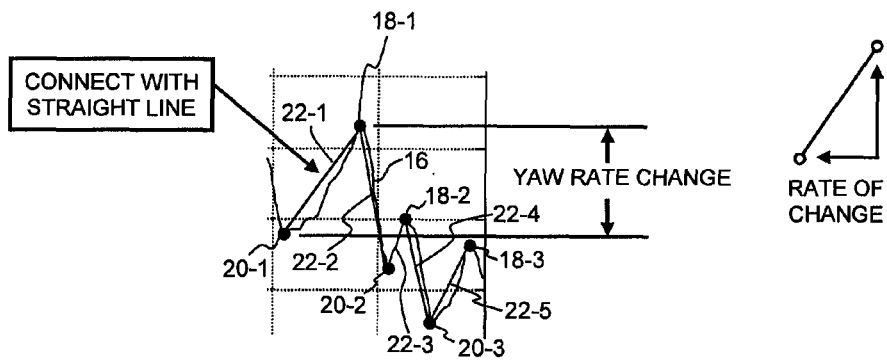
FIG. 5 is the detail view of FIG. 4 illustrating the determination of linear rates of change between local maxima and minima.

After the smoothing operation has been performed on the yaw rate curve 16, the controller 14 uses any conventional technique for identifying local maxima and minima as would be understood by one skilled in the art. In this example, the controller 14 uses a conventional mathematical algorithm for identifying minima and maxima by identifying the sample points on the yaw rate curve 16 where the slope of the line tangent to the point reverses sign with respect to the sign of the slope of the line tangent to the previous sampling point as understood by one skilled in the art. Once the local maxima and minima are identified, the controller 14 determines a linear rate of change (i.e., a linear slope) between each of the sequential maxima and minima as shown, for example, in FIG. 5. For example, the controller 14 determines a linear rate of change 22-1 between local minimum 20-1 and local maximum 18-1. Similarly, the controller 14 determines respective linear rates of change 22-2 through 22-5 between local maximum 18-1 and local minimum 20-2, between local minimum 20-2 and local maximum 18-2, between local maximum 18-2 and local minimum 20-3, and between local minimum 20-3 and local maximum 18-3, respectively. It is understood that although not explicitly shown in FIGS. 3 and 7 (discussed below), the linear rates of change are determined between each sequential local minima and maxima for the entire monitoring period of time.

Figure 6:
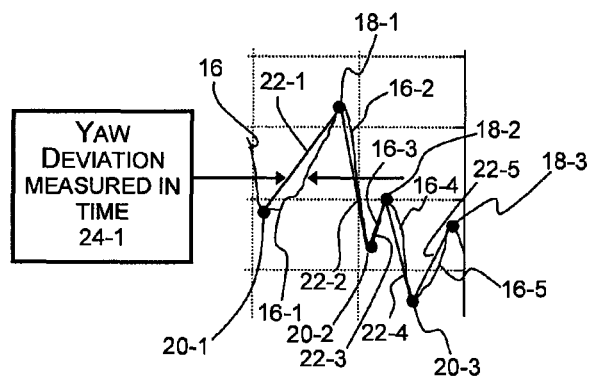
FIG. 6 is the detail view of FIG. 5 illustrating the determination of the maximum difference in time (units of time) between a value of the measured yaw rate and the same value of a computed linear yaw rate of change.

The controller 14 then compares the time at which the actual yaw rate between each of the local maxima and minima occurs to the theoretical time at which the same linear rate of change between the local maxima and minima would occur. For example, as shown in FIG. 6, the controller 14 evaluates the time separation at every sample point along segment 16-1 of the yaw rate curve 16 to computed points defining the linear rate of change 22-1. Likewise, the controller 14 evaluates the time separation for points along segments 16-2 through 16-5 of the yaw rate curve 16 to points along the linear rates of change 22-2 through 22-5, respectively. Again, it is understood that although not explicitly shown in FIGS. 3 and 7, the comparison of the actual yaw rate points between each local minima and maxima, and the associated computed linear rates of change between the minima and maxima, is performed for the entire monitoring period of time.

In this example, the controller 14 performs the comparison by computing the time separation between the yaw rate on the yaw rate curve 16 at each of the sampling times (i.e., the 10 Hz sampling frequency) matching the values of the linear rate of change for each of the corresponding sampling times. For instance, the controller 14 locates the values of the yaw rate on the segment 16-1 of the yaw rate curve 16 at each of the sampling times, finds the matching (i.e., equal within interpolation and rounding) linear rate of change 22-1 for each of the corresponding sampling times, and computes the difference in time. However, the controller 14 can compare the values of the yaw rate on the yaw rate curve 16 to the values of the linear rate of change at any suitable sampling rate, which can be different than the sampling rate performed in step S2.

In step S6, the controller 14 then assigns a "lag" or "lead" value that is determined based on the largest absolute difference (i.e., subtraction, and referred to herein simply as "difference") in time between the yaw rate curve 16 and the matching linear rate of change for that segment. The difference is determined to be a "lead" value if the value of the segment of the yaw rate curve 16 occurs before the linear rate of change between the local minimum and local maximum, and thus assigned a positive value. The difference is determined to be a "lag" value if the value of the segment of the yaw rate curve 16 occurs later than the linear rate of change between the local minimum and local maximum, and thus assigned a negative value.

For example, the largest difference in time between the segment 16-1 and the linear rate of change 22-1 occurs at time 24-1 as shown in FIG. 6, and at this maximum time difference, the point on segment 16-1 is later than the same value on the linear rate segment 22-1. Accordingly, the segment 16-1 is determined to have a maximum "lag" value that is equal to the difference in time found along the yaw segment 16-1 and the linear rate of change segment 22-1 at a first yaw rate identified by the arrows 24-1.

The controller 14 thus determines time differences occurring along each of the segments of the yaw rate curve 16 and the linear rates of change lines between the maxima and minima. These time differences are represented graphically in the bottom graph of FIG. 3. The lead values represented as 26-1 through 26-7 and the lag values represented as 28-1 through 28-7 identify lead and lag values, respectively, that exceed the respective thresholds illustrated in the bottom graph of FIG. 3. It should be noted that the periodic breaks in the graph occur at locations where sequential (e.g., adjacent) local minimum and maximum points in the yaw rate curve 16 in top graph of FIG. 3 are at the same yaw rate or too close together in time to have a separation between the two curves. Hence, any difference in time between the actual yaw rate curve 16 and the linear rate of change between those local minimum and maximum is zero or essentially zero, and thus appears as a break in the bottom graph of FIG. 3.

The controller 14 then determines in step S7 the number of maximum lead values that exceeds a lead threshold value, and the number of maximum lag values that exceeds a lag threshold value, for the monitoring time period (e.g., 80 seconds as discussed above). Naturally, instead of comparing the maximum lead values to a positive value threshold and the maximum lag values to a negative value threshold, the absolute value can be taken for each of the maximum lead values and maximum lag values, and those absolute values can thus be compared to the same threshold. The lead and lag threshold values are determined based on, for example, prior testing and review of real operational data (e.g., automobile driving data) to identify extremes in lead and lag values that occur during impaired operation versus "normal" lead and lag values that occur during unimpaired operation.

Various approaches could be used for monitoring the presence of lead and lag events and evaluating impairment. One or two occurrences of lead or lag values that exceed the respective thresholds during, for example, one minute might be indicative of a diversion of the driver's attention to the interior of the vehicle or other normal distraction. However, a measure of, for example, three occurrences of lead or lag values that exceed the respective thresholds during one minute while traveling at a particular speed might be indicative of ongoing distraction or intoxication. It is also likely that a combination in consideration of how often the lead or lag values exceed the thresholds and the size of the deviation of lead or lag values from the thresholds would best indicate different situations (e.g., intoxication versus a brief distraction). The lead and lag threshold values are thus set in order to distinguish likely impaired operation from normal operation. In this example, the lead threshold value is set to 0.3 (representing 0.3 seconds of lead) and the lag threshold value is set to −0.3 (representing 0.3 seconds of lag).

Figure 7:
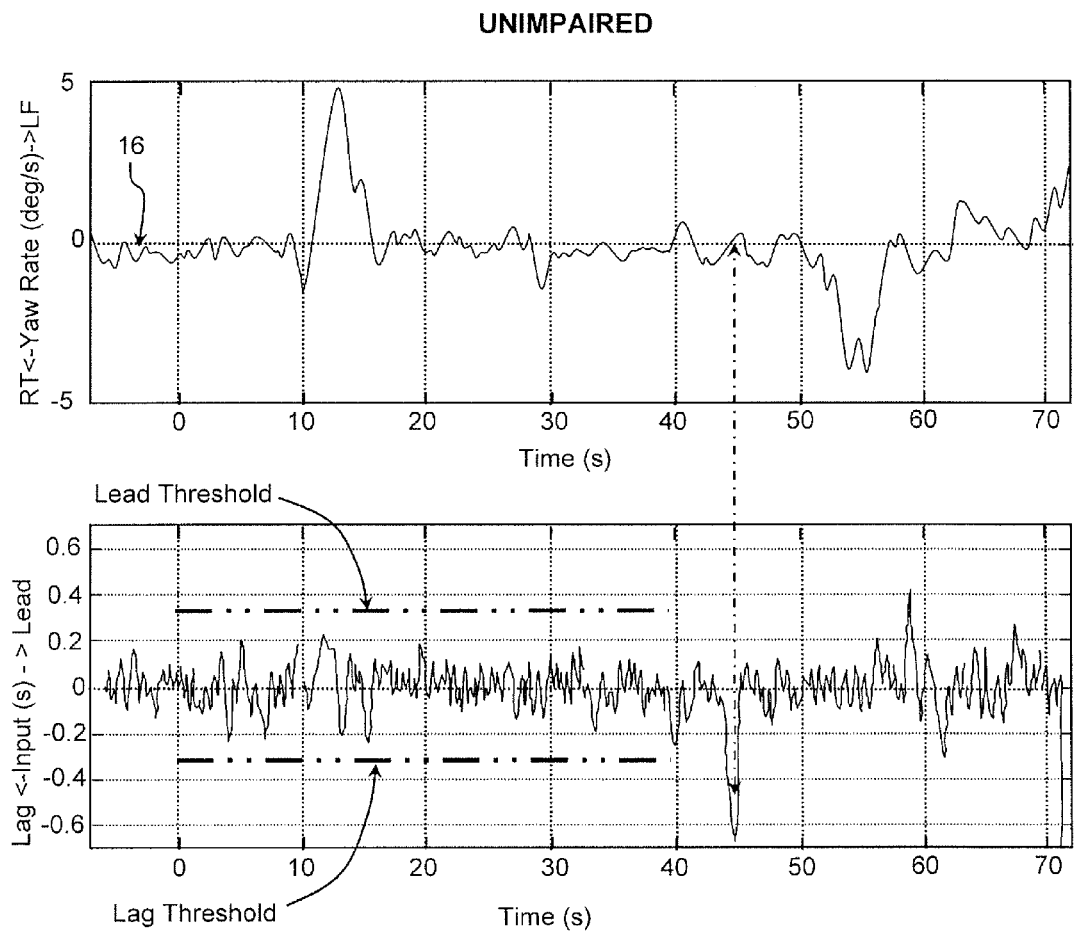
FIG. 7 is a graph set illustrating an example of yaw rate of the vehicle over a time period for an unimpaired operation condition.

If the number of maximum lead values and lag values does not exceed the lead and lag thresholds, respectively, more than a desired or "normal" number of times during the monitoring time period, the controller 14 determines in step S8 that the operation is unimpaired operation. FIG. 7 is an exemplary graphical representation of the detected yaw rate curve 16 in degrees/second over an arbitrary period of time during which operation is unimpaired. As can be appreciated from FIG. 7, spurious leads and lags in the yaw rate will also be detected. For example, an operator looking away from the forward road, and then correcting the accumulated error upon returning to a forward gaze, may cause a spurious lead or lag in the yaw rate when the operator corrects for an error in, for example, the travel path of the vehicle. This can be seen, for example, around the 45 second mark in FIG. 7. One or several spurious events will not result in the controller 14 identifying an impaired operation. However, a sequence of these spurious events in a short period of time could indicate ongoing inattention to the direction of travel, thus demonstrating impaired operation.

Hence, if the number of maximum lead values and lag values exceeds the lead and lag thresholds, respectively, more than a desired or "normal" number of times during the monitoring time period, the controller 14 determines in step S9 that the operation is impaired operation. Accordingly, in step S10, the controller 14 can activate, for example, an audio alert device 30, such as an alarm bell or buzzer, a visual alert device 32, such as displaying a warning message on a display, and/or a tactile alert device 34, which can be a vibration device on the steering column and/or on the brake pedal. The controller 14 can also apply a countermeasure that includes exerting a control over the vehicle HV to slow down or disable the vehicle HV by activating a braking, steering and/or ignition control device, an adaptive cruise control (ACC) system, and a lane departure warning (LDW) system as understood in the art. The countermeasure can also include the controller 14 operating a transceiver 38 to send information to a location external of the vehicle HV, such as to law enforcement authorities. The countermeasure devices are conventional structures that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

In addition, the controller 14 can also monitor the wobble condition of the vehicle HV based on signals provided by a wobble sensor 40. Furthermore, the controller 14 can monitor operator facial expression and operator attentiveness based on signals received from a video detector 42 that represent images of the operator. In addition, the controller 14 can monitor for the presence of alcohol in the passenger compartment of the vehicle HV based on signals provided by an alcohol sensor 44. Accordingly, instead of determining an impaired operation condition based solely on the number of maximum lead values and lag values that exceeds the lead and lag thresholds, the controller 14 can additionally base the determination of impaired or unimpaired operation on a detected wobble condition of the vehicle HV, a detected operator facial expression, a detected operator attentiveness, and/or a detected presence of alcohol in a passenger compartment of the vehicle HV.

The wobble sensor 40, the video detector 42 and the alcohol sensor 44 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the impaired operation detection method.

The processing then repeats steps S1 through S10 as discussed above for each sample time, with the monitoring period acting as a window of time whose starting point moves for every sampling time after the first monitoring period has elapsed. For example, assuming that the monitoring period is 80 seconds and the sampling rate is 10 Hz, when the first sample is taken at time 0, the initial monitoring period will extend from time 0 to time 80 seconds. Thus, the processing of steps S1 through S10 will continue for that initial 80 second monitoring period, with the comparison in step S7 determining whether the lead and/or lag threshold have been exceeded a prescribed number of times during the time between 0 seconds and 80 seconds. After the initial 80 second monitoring period has elapsed, when the sample is taken at time 80.1 seconds, the monitoring period will extend from 0.1 seconds to 80.1 seconds. In this event, the comparison that occurs in step S7 determines whether the lead and/or lag threshold have been exceeded a prescribed number of times during the time between 0.1 seconds and 80.1 seconds. Similarly, when the sample is taken at 80.2 seconds, the monitoring period will extend from 0.2 seconds to 80.2 seconds, and so on. Accordingly, the controller 14 is effectively continuously checking the yaw rate curve 16 for an 80 second monitoring period including and preceding the most recent sample.

In addition, although the above example describes determining a time difference between the actual yaw rate and linear rate of change of the yaw rate, other types of differences can be determined to identify impaired and unimpaired operation. For example, the controller 14 can determine differences in the magnitude between the segments 16-1 through 16-5 of the yaw rate curve 16 and the corresponding linear rates of change 22-1 through 22-5 at the time samples. The controller 14 can then identify the respective maximum yaw difference in the yaw rates corresponding to each segment based on the maximum difference in magnitude. The controller 14 can then compare these maximum yaw difference values to yaw difference thresholds whose values are set to distinguish likely impaired operation from normal operation for such magnitude differences.

In the above examples, a component on the vehicle 10, such as the controller 14, performs the operations in steps S1 though S10 for identifying impaired or unimpaired operation. However, the controller 14 can also, or alternatively, be an off-vehicle server 39 connected to either incoming real-time data transmitted from transceiver 38, or stored data that has been accumulated through other means (e.g., data downloads during experiments) and stored on the server 39 over extended periods, such as during extended data collection for driving studies or product development testing. The server 39 can then perform the operations of steps S1 through S10 as discussed above, to identify impaired or unimpaired operation for the monitoring periods. In this event, instead of performing counter measures in step S10, the server 39 can flag any monitoring period during which impaired operation was determined. The server 39 can store yaw rate data collected over months, years, or any prescribed time period, and identify the unimpaired and impaired monitoring periods for the entire collection of yaw rate data received from a particular vehicle. Naturally, the server 39 can receive respective yaw rate data from each of a plurality of respective vehicles, and perform the operations of steps S1 through S10 on each of the respective data, to identify impaired and unimpaired driving statistics for each respective vehicle.

As can be appreciated from the above, impaired vehicle operation can be detected by tracking lead and lag variances from a linear yaw interpolation between a minimum and maximum over time. As the vehicle HV travels, a linear yaw interpolation is created by tracking the minimum and maximum yaw points (i.e., extrema), and drawing a linear line between sequential local minimum and maximum yaw points. A lead is detected when the recorded yaw occurs before the computed linear interpolation, and a lag is detected when the yaw occurs after the linear interpolation. Lead and lag variation events are common during impaired operation, and they thus provide an accurate indicator for the detection of impaired operation. The number of lead and lag events that exceed respective lead and lag thresholds of variance allowed for lead and lag are counted, and impaired vehicle operation is determined based on the number of events counted for a predetermined amount of time. By providing a variance threshold and counting the numbers of lead and lag variation events over a period of time, impaired operation can be detected more accurately over a short period of time, while avoiding or at least minimizing instances of false positives.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also as used herein to describe the above embodiment(s), the following directional terms "forward", "rearward", "above", "downward", "vertical", "horizontal", "below" and "transverse" as well as any other similar directional terms refer to those directions of a vehicle equipped with components for performing the impaired operation detection method. Accordingly, these terms, as utilized to describe the present invention should be interpreted relative to a vehicle equipped with the components for performing the impaired operation detection method. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An impaired operation detection method comprising:
    sensing a yaw rate of a vehicle over a time period;
    identifying time points of the time period in which the yaw rate changes direction;
    determining a linear rate of change in the yaw rate between two of the time points that are sequential in time;
    examining an actual rate of change in the yaw rate occurring between the two of the time points;
    determining a difference between the actual rate of change and the linear rate of change to obtain a difference value; and
    determining an operator's impairment condition based on the difference value.

2. The impaired operation detection method according to claim 1, wherein
    the determining of the difference between the actual rate of change and the linear rate of change includes determining a time difference between a first time when the actual rate of change is at a first value and a second time when the linear rate of change is at the first value to obtain the difference value as a time difference value; and
    the determining the operator's impairment condition includes determining the operator's impairment condition based on the time difference value.

3. The impaired operation detection method according to claim 2, wherein
    the identifying of the time points includes identifying the time points that correspond to a local maximum yaw rate value and a local minimum yaw rate value.

4. The impaired operation detection method according to claim 3, wherein
    the identifying of the time points includes identifying a plurality of time points that correspond to a plurality of the local maximum yaw rate values and a plurality of time points that correspond to a plurality of the local minimum yaw rate values;
    the determining of the linear rate of change in the yaw rate includes determining the linear rate of change in the yaw rate between sequential ones of the local maximum and minimum yaw rate values;
    the examining of the actual rate of change in the yaw rate includes examining the actual rate of change in the yaw rate between sequential ones of the local maximum and minimum yaw rate values;
    the determining of the time difference includes determining, between respective sequential ones of the local maximum and local minimum yaw rate values, a respective difference between a respective first time when the actual rate of change is at a respective first value and a respective second time when the linear rate of change is at the respective first value, to obtain a plurality of the time difference values; and
    the determining of the operator's impairment condition based on several of the time difference values.

5. The impaired operation detection method according to claim 4, wherein
    the determining of the time difference includes identifying when one of the respective actual rates of change is occurring earlier than the associated linear rate of change or later than the associated linear rate of change.

6. The impaired operation detection method according to claim 1 wherein
    the yaw rate includes a left yaw rate component representing a leftward yaw rate direction of the vehicle and a right yaw rate component representing a rightward yaw rate direction of the vehicle.

7. The impaired operation detection method according to claim 4, wherein
    the determining of the time difference includes subtracting respective first time values representing the respective first times from corresponding second time values representing the respective second times to obtain the time difference values.

8. The impaired operation detection method according to claim 7, wherein
    the time difference values that have a positive value represent a lead condition in which the actual rate of change occurs earlier than the linear rate of change for corresponding segments between sequential ones of the local maximum and minimum yaw rate values, and
    the time difference values that have a negative value represent a lag condition in which the actual rate of change occurs later than the linear rate of change between sequential ones of the local maximum and minimum yaw rate values.

9. The impaired operation detection method according to claim 8, wherein
    the determining of the operator's impairment condition includes counting the lead and lag conditions occurring in the time period, and evaluating the operator's impairment condition based on a total number of the lead and lag conditions that were counted.

10. The impaired operation detection method according to claim 9, wherein
    the counting of the lead and lag conditions occurring in the time period includes only counting the lead and lag conditions in which the time difference values exceed a prescribed threshold.

11. The impaired operation detection method according to claim 9, further comprising
    providing an alert to an operator of the vehicle when the number of the time difference values exceeds a first amount.

12. The impaired operation detection method according to claim 11, further comprising
    applying a countermeasure that includes at least one of exerting a control over the vehicle and sending information to a location external of the vehicle in response to the number of the time difference values exceeding a second amount that is greater than the first amount.

13. The impaired operation detection method according to claim 11, wherein
    the alert includes at least one of an audio alert, a visual alert and a tactile alert.

14. The impaired operation detection method according to claim 4, wherein the determining of the operator's impairment condition includes comparing the time difference values to at least one threshold value and evaluating the operator's impairment condition based on a number times that the time difference values exceed the at least one threshold.

15. The impaired operation detection method according to claim 1, wherein
the sensing of the yaw rate includes receiving information from a yaw rate detector on the vehicle.

16. The impaired operation detection method according to claim 1, wherein
the determining of the operator's impairment condition further includes using additional information that includes at least one of:
a detected wobble condition of the vehicle,
a detected operator facial expression,
a detected operator attentiveness, and
a detected presence of alcohol in a passenger compartment of the vehicle.

17. The impaired operation detection method according to claim 4, wherein
the determining of the operator's impairment condition includes comparing the time difference values in a first group having the actual rates of change earlier than corresponding ones of the linear rates of change to a lead threshold, and comparing the time difference values in a second group having the actual rates of change later than corresponding ones of the linear rates of change to a lag threshold, and evaluating the operator's impairment condition based on a number of times that the time difference values exceed the lead and lag thresholds.

18. The impaired operation detection method according to claim 1, wherein
the difference determining includes determining the difference as a maximum difference between the actual rate of change and the linear rate of change.

19. The impaired operation detection method according to claim 1, wherein
the yaw rate sensing, time point identifying, linear rate of change determining, actual rate of change examining, difference determining and operator's impairment condition determining are performed while the operator is operating the vehicle.

20. The impaired operation detection method according to claim 1, further comprising:
receiving and storing data representing the yaw rate sensed during the yaw rate sensing at a location off the vehicle; and
wherein the time point identifying, linear rate of change determining, actual rate of change examining, difference determining and operator's impairment condition determining are performed based on the data after the storing of the data.

21. An impaired operation detection system comprising:
a sensor configured to sense a yaw rate of a vehicle over a time period; and
a controller configured to receive a signal indicative of the yaw rate of the vehicle,
the controller being further configured to
identify time points of the time period in which the yaw rate changes direction based on the signal from the sensor;
determine a linear rate of change in the yaw rate between two of the time points that are sequential in time,
examine an actual rate of change in the yaw rate occurring between the two of the time points,
determine a difference between the actual rate of change and the linear rate of change to obtain a difference value, and
determine an operator's impairment condition based on the difference value.

22. The impaired operation detection system according to claim 21, wherein
the controller determines the difference by determining a difference between a first time when the actual rate of change is at a first value and a second time when the linear rate of change is at the first value to obtain the difference value as a time difference value, and determines the operator's impairment condition based on the time difference value.

23. The impaired operation detection system according to claim 21, wherein
the controller is configured to identify the time points, determine the linear rate of change, examine the actual rate of change, determine the difference and determine the operator's impairment while the operator is operating the vehicle.

24. The impaired operation detection system according to claim 21, wherein:
the controller is disposed at a location off the vehicle, and is configured to control storing of data representative of the signal indicative of the yaw rate of the vehicle at the location off the vehicle; and
the controller is configured to identify the time points, determine the linear rate of change, examine the actual rate of change, determine the difference and determine the operator's impairment based on the data after storing the data.

* * * * *